(12) United States Patent
Spiewak et al.

(10) Patent No.: US 6,686,026 B2
(45) Date of Patent: Feb. 3, 2004

(54) MICRO-CHANNELED PROTECTIVE FILM (75) Inventors: Brian E. Spiewak, Inver Grove Heights, MN (US); David W. Hegdahl, Lino Lakes, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 95 days.

(21) Appl. No.: 10/118,347

(22) Filed: Apr. 8, 2002

(65) Prior Publication Data

US 2003/0190458 A1 Oct. 9, 2003

(51) Int. Cl.$^7$ .............................. B32B 3/28; B32B 31/00; B65D 65/02

(52) U.S. Cl. ...................... 428/167; 428/42.1; 428/172; 428/188; 428/343; 156/292; 150/166

(58) Field of Search ................................ 428/42.1, 167, 428/172, 188, 343; 156/290, 291, 292; 150/166

(56) References Cited

U.S. PATENT DOCUMENTS

| | | | |
|---|---|---|---|
| 2,861,006 A | | 11/1958 | Salditt |
| 3,386,846 A | | 6/1968 | Lones |
| 4,135,023 A | | 1/1979 | Lloyd et al. |
| 4,894,060 A | | 1/1990 | Nestegard |
| 5,112,882 A | | 5/1992 | Babu et al. |
| 5,194,299 A | * | 3/1993 | Fry .......................... 427/208.6 |
| 5,227,233 A | * | 7/1993 | Itaba et al. .................. 428/354 |
| 5,268,228 A | * | 12/1993 | Orr ............................. 428/343 |
| 5,405,675 A | | 4/1995 | Sawka et al. |
| 5,407,970 A | | 4/1995 | Peterson et al. |
| 5,644,007 A | | 7/1997 | Davidson et al. |
| 5,650,214 A | | 7/1997 | Anderson et al. |
| 5,650,215 A | | 7/1997 | Mazurek et al. |
| 5,747,132 A | | 5/1998 | Matsui et al. |
| 6,030,702 A | | 2/2000 | Matsui et al. |
| 6,093,466 A | | 7/2000 | Steinke et al. |
| 6,106,922 A | | 8/2000 | Cejka et al. |
| 6,197,397 B1 | | 3/2001 | Sher et al. |
| 6,203,885 B1 | | 3/2001 | Sher et al. |

FOREIGN PATENT DOCUMENTS

| | | |
|---|---|---|
| EP | 0 210 261 B1 | 6/1991 |
| EP | 0 519 278 A2 | 12/1992 |
| EP | 0 887 393 A2 | 12/1998 |
| EP | 0 892 026 A2 | 1/1999 |
| EP | 0 992 558 A2 | 4/2000 |
| EP | 0 768 354 B1 | 1/2001 |
| GB | 1 511 060 | 5/1978 |
| JP | 06-073352 | 3/1994 |
| JP | HEI 7-89468 | 4/1995 |

(List continued on next page.)

OTHER PUBLICATIONS

Japanese Industrial Standard, "Testing Methods for Determination of the Water Vapour Transmission Rate of Moisture-Proof Packaging Materials (Dish Method)", JIS Z 0208, 1976.

Japanese Industrial Standard, "Surface roughness—Definitions and designation", JIS B 0601, 1994.

*Primary Examiner*—Donald J. Loney
(74) *Attorney, Agent, or Firm*—Colene H. Blank (57) ABSTRACT

The present invention relates to a film comprising a backing and an adhesive. The backing comprises a base layer comprising a first major surface and a second major surface, and at least two rails, each rail comprising a tip surface. The rails extend from the second major surface of the base layer and define micro-channels therebetween. The micro-channels comprise a channel surface. The film comprises an adhesive on the tip surface of the rails. At least a portion of the channel surface is substantially free of adhesive. The present invention also relates to a method of protecting an automobile comprising preparing an automobile surface for application of a protective tape and applying a protective tape to the automobile surface. The present invention is additionally related to a method of manufacturing a protective film.

22 Claims, 3 Drawing Sheets

FOREIGN PATENT DOCUMENTS

| | | |
|---|---|---|
| JP | 7-188625 | 7/1995 |
| JP | 7-216314 | 8/1995 |
| JP | 8-143830 | 6/1996 |
| JP | 8-143838 | 6/1996 |
| JP | 9-94904 | 4/1997 |
| JP | 9-220517 | 8/1997 |
| JP | H 9-291262 | 11/1997 |
| JP | 10-287852 | 10/1998 |
| JP | 11-302605 | 11/1999 |
| WO | WO 91/00945 | 1/1991 |
| WO | WO 99/58620 | 11/1999 |
| WO | WO 00/69985 | 11/2000 |

\* cited by examiner

MICRO-CHANNELED PROTECTIVE FILM

FIELD OF THE INVENTION

The present invention relates to an adhesive article, specifically an adhesive article suitable for the protection of finished exterior surfaces of an automobile from damage or discoloration.

BACKGROUND OF THE INVENTION

Automobiles require protection from the elements such as sun, airborne debris, dust, rainwater or other harmful matters that can damage, dull or discolor the paint on an automobile. Protection is required during transportation of automobiles from one location to another (e.g. from the manufacturing plant to the dealer) on trucks or ships.

Various surface protective sheets comprising a support and an adhesive layer formed on the support are known. Generally, a protective sheet consists of a low-cost, ultraviolet stabilized, impact resistant polyolefin sheet coated with a thin layer of adhesive. Examples of protective sheets can be found in, for example, U.S. Pat. No. 6,030,702 assigned to Nitto Denki Corporation (Osaka, JP) and Kansai Paint Co., Ltd. (Hyogo, JP). The automobile has a clearcoat finish on the paint that may not be fully cured prior to the application of the protective film. Despite the protective benefits of known flat protective films, these films may interfere with the incompletely cured clearcoat finish, causing defects in the painted system, for example surface defects in the clearcoat finish on the automobile paint. Additionally, the films may leave behind adhesive residue upon removal.

One common surface defect is the deterioration or discoloration of the paint system resulting from water or water vapor that is entrapped between the protective sheet and the paint system. The water or water vapor may be present between the protective sheet and the paint system for a sufficiently long period of time to cause damage. Such damage may occur even if the water and water vapor cannot be seen when applying the protective film.

Additionally, because protective films are applied in large sheets, it is difficult to apply the film without wrinkles and bubbles in the film, which can lead to extra moisture entrapment.

The present invention is directed to micro-channeled protective films that address the problems associated with known flat protective films.

SUMMARY OF THE INVENTION

The present invention relates to a film comprising a backing and an adhesive. The backing comprises a base layer comprising a first major surface and a second major surface, and at least two rails, each rail comprising a tip surface. The rails extend from the second major surface of the base layer and define micro-channels therebetween. The micro-channels comprise a channel surface. The film comprises an adhesive on the tip surface of the rails. At least a portion of the channel surface is substantially free of adhesive.

In other aspects of the invention the backing is multilayer. In certain embodiments, the base layer is multilayer, or the rails are multilayer, or both. In some embodiments, the base layer comprises a first material and the rails comprise a second material, the first material being different from the second material.

In some aspects of the present invention, the second major surface of the base layer is substantially free of adhesive. In other aspects of the invention, the rails have a side surface, and the side surface is substantially free of adhesive.

The present invention also relates to a method of protecting an automobile comprising preparing an automobile surface for application of a protective tape and applying a protective tape to the automobile surface. The protective tape comprises a backing and an adhesive. The backing comprising a base layer comprising a first major surface and a second major surface, and at least two rails having a tip surface, the rails extending from the second major surface of the base layer, the rails defining micro-channels therebetween, the micro-channels comprising a channel surface. The film comprises an adhesive on the tip surface of the rails.

In certain aspects of the invention, the method further comprises exposing the protective tape to an elevated temperature after applying the protective tape to the automobile surface to soften the rails and cause them to flow together to thereby partially or completely eliminate the micro-channels.

The present invention is additionally related to a method of manufacturing a protective film comprising providing at least one film forming material, providing an adhesive material, feeding the film forming material and the adhesive material into an extrusion process having a die, wherein the die has a profile, and simultaneously extruding the adhesive material and the film forming material through the die to create micro-channels in the film forming material.

DETAILED DESCRIPTION OF THE INVENTION

Figure 1:
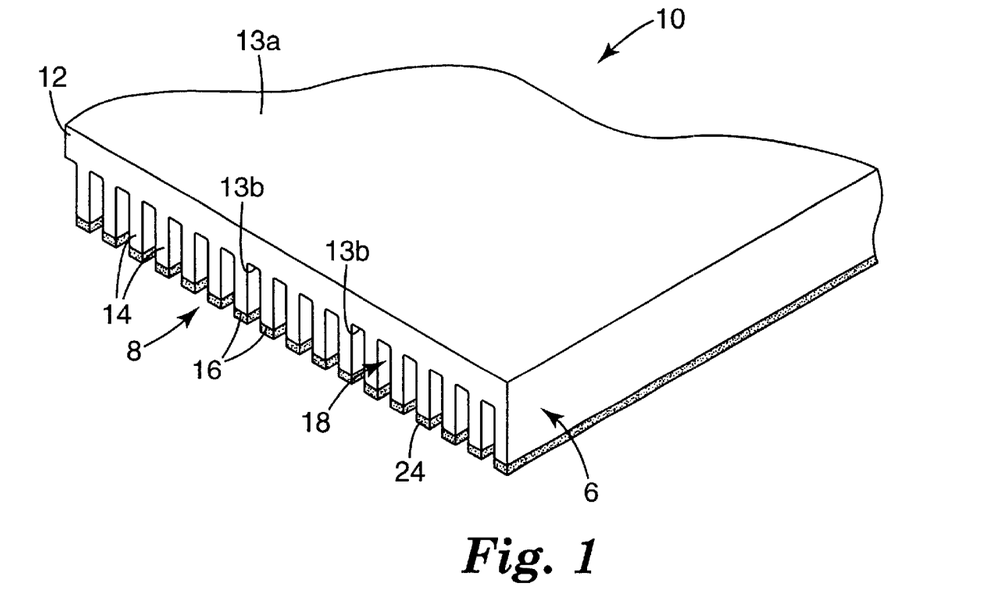
FIG. 1 is an elevated view of an embodiment of the micro-channeled protective film of the present invention.
Figure 2:
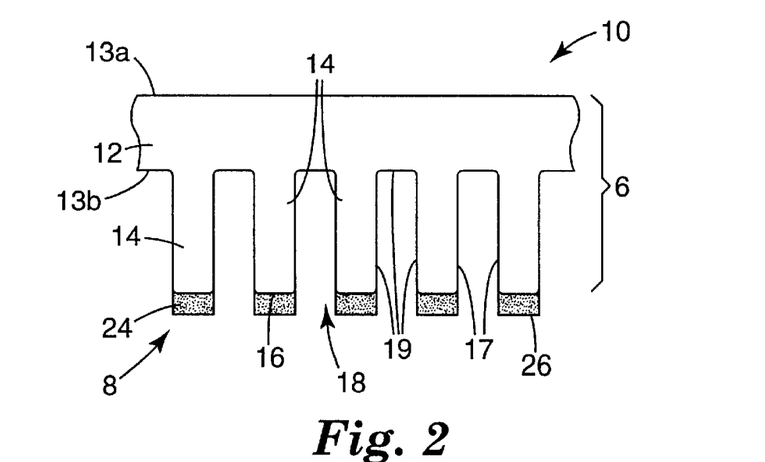
FIG. 2 is an end view of the micro-channeled protective film shown in FIG. 1.

The present protective film 10 may be manufactured using profile co-extrusion techniques. A backing material is extruded through a die shaped to produce a structured sheet 6 having a micro-channeled surface 8 as depicted in FIGS. 1 and 2. After extrusion, the sheet 6 is in a softened state and is then quenched, for example in a water bath.

FIGS. 1 and 2 illustrate an embodiment of the present invention. The structured sheet 6 comprises a base layer 12 with a first major surface 13a and a second major surface 13b. At least two rails 14 extend from the second major surface 13b, forming the micro-channeled surface 8. The rails 14 have a tip surface 16 and side surfaces 17. The rails 14 define micro-channels 18 between any two rails 14. The micro-channels 18 have channel surface 19, which includes side surfaces 17 of the adjacent rails and the second major surface of the base layer 13b. The structured sheet 6 may be a single material or may be multiple materials, which would create a multilayer structure. In some embodiments, the base layer 12 is a multilayer structure. In other embodiments, the rails 14 are a multilayer structure. In certain embodiments, the rails 14 are a different material than the base layer 12.

The structured sheet 6 may be used as an automobile protective tape comprising rails 14 as depicted in FIGS. 1 and 2, having certain dimensions. The rails may have a width of about 1 to about 200 mil (about 0.03 to about 5.0 millimeters), for example between about 2 and about 20 mil (about 0.05 and about 0.5 millimeter) along the second major surface 13b of the base layer 12. The rails 14 additionally extend a distance from the top surface of the second major surface of the base layer 13b from about 1 to about 100 mil (about 0.03 to about 2.5 millimeter), for example between about 5 and about 50 mil (about 0.1 to about 1.3 millimeter). The distance between adjacent side surfaces 17 of rails on the second major surface of the base layer 13b is about 2 to about 200 mil (about 0.05 to about 5.0 millimeter), for example between about 10 and about 40 mil (about 0.3 to about 1 millimeter). The base layer 12 is generally between about 0.1 and about 500 mil (about 0.003 and about 12.7 millimeters) thick, for example between about 1 and about 5 mil (about 0.03 and about 0.13 millimeters). In certain embodiments, the rails and the distance between the rails are uniform over the protective film 10, in other embodiments, the dimensions are varied over the sheet.

Figure 3A:
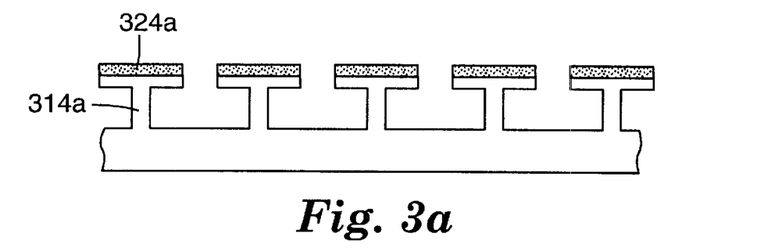
FIGS. 3a–3h are end views of embodiments of the micro-channeled protective film of the present invention
Figure 3B:
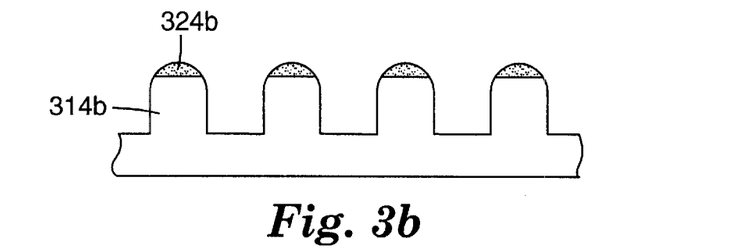
Figure 3C:
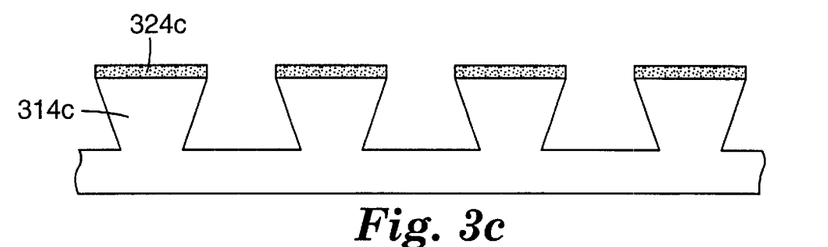
Figure 3D:
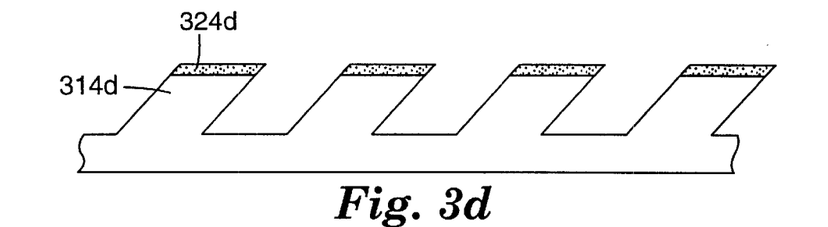
Figure 3E:
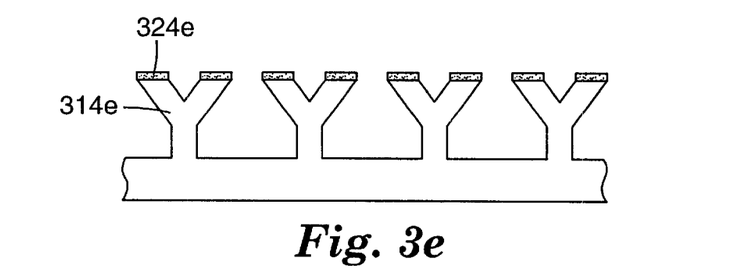
Figure 3F:
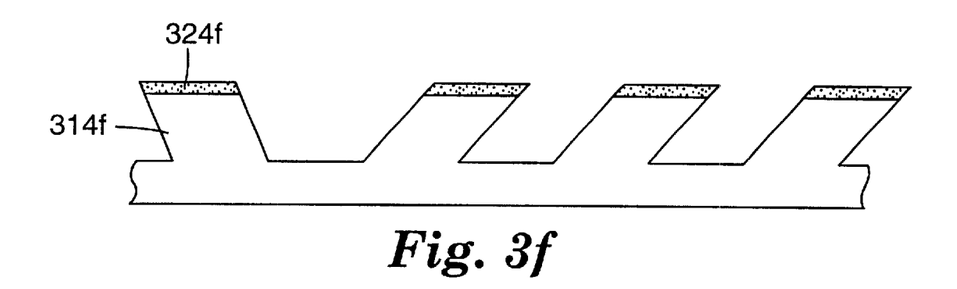
Figure 3G:
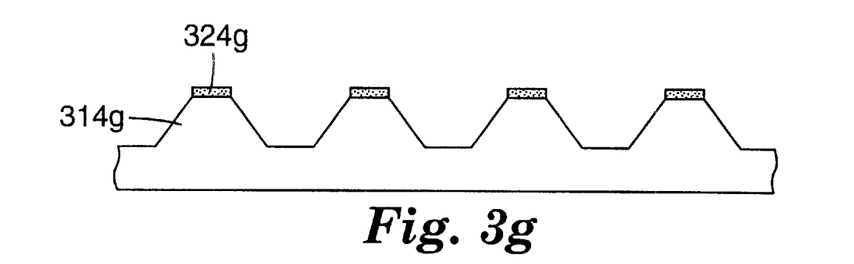
Figure 3H:
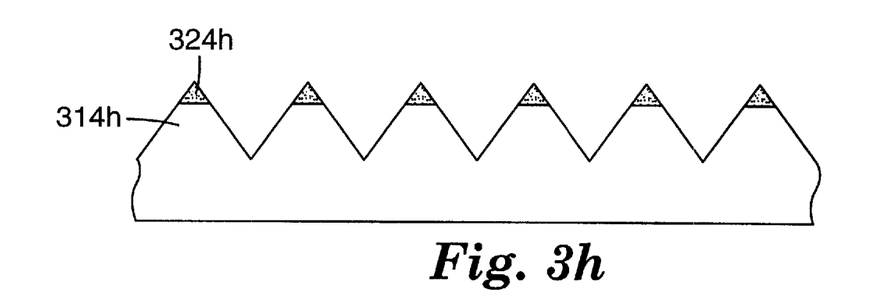

In embodiments of the present invention, the rails 14 may be as shown in FIGS. 1 and 2. However, other embodiments of the present invention may include rails 314a–314h shaped as shown in FIGS. 3a though 3h with adhesive layers 324a–324h. The shape of the rails 314a–314h depends on the desired use for the present invention and the shape of the die used to extrude the structured sheet 6.

Generally, the rails 14 extend in a substantially parallel relationship with respect to one another in a single direction along the base layer 12, each rail 14 being either substantially continuous along the entire length of the base layer 12 or substantially discontinuous along the entire length of the base layer 12. In embodiments with discontinuous rails, the rails form micro-protrusions (not shown). In one embodiment, the rails 14 may be slit in a transverse direction generally parallel to the base layer 12. The structured sheet 6 may then be stretched to elongate the structured sheet 6 along its longitudinal direction (generally parallel to the rails 14), the slit rails creating microprotrusions (not shown). See, for example, U.S. Pat. No. 4,984,060 to Nestegard, incorporated by reference herein, which discloses cutting or slicing ribs. Additional stretching in other directions may be performed to augment the pathways for the escape of water or water vapor. However, generally the rails are kept intact and continuous.

The micro-channeled film of the present invention additionally includes an adhesive layer 24. In certain embodiments as shown in FIG. 1, the adhesive layer 24 is only present on the tip surface 16 of the rails 14, and the channel surface 19 is substantially free of adhesive. In some embodiments, the second major surface of the base layer 13b is substantially free of adhesive, or the side surface of the adjacent rails 17 are substantially free of adhesive, or both are substantially free of adhesive. Substantially free of adhesive includes completely free of adhesive. Such an embodiment may be manufactured by adding the adhesive layer 24 to the profile co-extrusion process to provide a continuous process of manufacture. The adhesive is processed through the die in such a way as to only exit the die on the tip surface 16 of the rails 14. The adhesive layer 24 may also be limited to the tip surface 16 of the rails 14 by coating the adhesive only onto the tip surface 16 of the rails 14 using any coating technique known in the art. The adhesive layer 24 extends from the tip surface of the rails 16 to the tip surface of the adhesive layer 26. Generally, the adhesive layer is thick enough to hold the structured sheet 6 to a substrate, for example between about 0.1 and about 10 mils thick (about 0.003 and about 0.25 millimeters).

In other embodiments, the adhesive is coated on the entire micro-channeled surface 8 after the structured sheet 6 is formed. This may be accomplished by any method known in the art, such as hot melt coating, coating out of solution and drying, and melt blowing. Examples of suitable films are described in, for example, U.S. Pat. Nos. 4,135,023 (Lloyd, et al.); U.S. Pat. No. 3,386,846 (Lones); and U.S. Pat. No. 2,861,006 (Salditt).

In other embodiments, the adhesive may be coated, for example by melt blowing, onto the micro-channeled surface 8 of the structured sheet 6. The coated sheet may then be treated, for example by heating with infrared lamps to cause the adhesive to cleave, retract, and remain mostly on the tip surface of the rails.

For an embodiment useful as an automobile protective sheet, the surface roughness (Ra) of the resulting backing is generally about 100 to about 500 micrometers (as calculated according to Surface Roughness, Definitions and Designations, Japanese Industrial Standard JIS B 0601).

The backing is formed of suitable elastomeric or polymeric materials, generally thermoplastic materials, although thermosetting materials could be used in some embodiments. Suitable thermoplastic polymers include, for example, polyolefins and copolymers of polyolefins. Examples of polyolefins include polypropylene, polyethylene, and polystyrene. Additional suitable backing materials include polyester, polycarbonate, polymethyl methacrylate, ethylene vinyl acetate copolymers, acrylate-modified ethylene vinyl acetate polymers, ethylene acrylic acid copolymers, acrylonitrile-butadiene-styrene terpolymers, nylon, polyvinylchloride, and engineering polymers such as polyketones or polymethylpentanes. Elastomers include, for example: natural or synthetic rubber; styrenic copolymers containing isoprene, butadiene, ethylene, butylene, or acrylonitrile; metallocene-catalyzed polyolefins; polyurethanes; and polydiorganosiloxanes. Mixtures of the polymers and/or elastomers may also be used.

Examples of suitable polymeric films include polypropylene copolymers sold under the trade designations 7C06, 7C50 and 7C55H, available from Dow Plastics, Ltd. (Midland, Mich. (formerly available from Union Carbide Corp.)) The polypropylene copolymers are especially desirable for a base layer 12. Additional suitable polymers include polyolefin elastomers such as those sold under the tradenames ENGAGE 8100, ENGAGE 8180, ENGAGE 8200, ENGAGE 8480 and ENGAGE 8540, commercially available from Dupont-Dow Elastomers (Wilmington, Del.); LOTRYL 28MA07 and LOTRYL 30BA02, commercially available from Atofina Chemicals, Inc. (Philadelphia, Pa.). The polyolefin elastomers are especially desirable for rails 14.

In certain embodiments, the rails 14 are formed from a material that softens above room temperature but at a temperature below the temperature the sheet 6 will be exposed to during use. For example, if the sheet 6 is an automobile protective sheet, it may be exposed to a temperature up to and exceeding about 80° C. Therefore, the rails may be formed from a polymeric material that softens below 80° C. Examples of suitable materials include thermoplastic polyolefins such as those sold under the tradenames ENGAGE 8100, ENGAGE 8180, commercially available form Dupont-Dow Elastomers (Wilmington, Del.).

Any suitable pressure sensitive adhesive composition can be used for this invention. The pressure sensitive adhesive component can be any material that has pressure sensitive adhesive properties. Furthermore, the pressure sensitive adhesive component can be a single pressure sensitive adhesive or the pressure sensitive adhesive can be a combination of two or more pressure sensitive adhesives.

Pressure sensitive adhesives useful in the present invention include, for example, those based on natural rubbers, synthetic rubbers, styrene block copolymers, polyvinyl ethers, poly(meth)acrylates (including both acrylates and methacrylates), polyolefins, and silicones.

The pressure sensitive adhesive may be inherently tacky. If desired, tackifiers may be added to a base material to form the pressure sensitive adhesive. Useful tackifiers include, for example, rosin ester resins, aromatic hydrocarbon resins, aliphatic hydrocarbon resins, and terpene resins. Other materials can be added for special purposes, including, for example, oils, plasticizers, antioxidants, ultraviolet stabilizers, hydrogenated butyl rubber, pigments, and curing agents.

In one embodiment, the pressure sensitive adhesive is based on at least one poly(meth)acrylate (e.g. is a (meth) acrylic pressure sensitive adhesive). Poly(meth)acrylic pressure sensitive adhesives are derived from, for example, at least one alkyl (meth)acrylate ester monomer such as, for example, isooctyl acrylate, isononyl acrylate, 2-methylbutyl acrylate, 2-ethyl-hexyl acrylate and n-butyl acrylate; and at least one optional co-monomer component such as, for example, (meth)acrylic acid, vinyl acetate, N-vinyl pyrrolidone, (meth)acrylamide, a vinyl ester, a fumarate, a styrene macromer, or combinations thereof. Generally, the poly(meth)acrylic pressure sensitive adhesive is derived from between about 0 and about 20 weight percent of acrylic acid and between about 100 and about 80 weight percent of at least one of isooctyl acrylate, 2-ethyl-hexyl acrylate or n-butyl acrylate composition, preferably isooctyl acrylate. Certain embodiments for the present invention is derived from between about 2 and about 10 weight percent acrylic acid and between about 90 and about 98 weight percent of at least one of isooctyl acrylate, 2-ethyl-hexyl acrylate or n-butyl acrylate composition. One specific embodiment for the present invention is derived from about 2 weight percent to about 10 weight percent acrylic acid, about 90 weight percent to about 98 weight percent of isooctyl acrylate, and about 2 weight percent to about 6 weight percent styrene macromer.

In another embodiment, the pressure sensitive adhesive is a polyolefin based pressure sensitive adhesive. This is especially useful if the rails are formed of an olefin based polymer. A suitable polyolefin has a glass transition temperature ($T_g$) preferably in the range of −70° C. to 0° C., more preferably in the range of −60° C. to −20° C., and an average inherent viscosity in the range of 0.4 dL/g to 9.0 dL/g, preferably in the range of 0.5 dL/g to 6.0 dL/g, and more preferably in the range of 1.5 dL/g to 4.0 dL/g as determined using a Number 50 Cannon-Fenske Viscometer tube, with a 0.1 g/dL solution of polymer in toluene, at 27° C. The ranges of inherent viscosity should provide a poly (1-alkene) polymer that is soft enough to be melt processed.

An inherent viscosity above these values may result in a polymer that is difficult to melt process. An inherent viscosity below the above-stated values may cause the pressure-sensitive adhesive composition to cohesively fracture and leave a residue when removed. Crosslinking the pressure-sensitive adhesive composition may extend the lower range of acceptable inherent viscosity for the polyolefin beyond that which is acceptable for an uncrosslinked polyolefin. Number average molecular weights of the uncrosslinked polyolefin polymers are preferably in the range of 5,000 to 50,000,000, more preferably 50,000 to 5,000,000.

Useful polyolefins include, for example, non-crystalline polymers such as $C_5$ to $C_{12}$ polyolefin homopolymers and copolymers, including copolymers with $C_3$; more preferably $C_6$ to $C_{10}$ polyolefin homopolymers and copolymers, including copolymers with $C_3$; most preferably $C_6$ to $C_8$ polyolefin homopolymers and copolymers, including copolymers with $C_3$. Particularly useful polyolefins are poly(1-hexene) and poly(1-octene), described in U.S. Pat. No. 5,644,007 (Davidson, et al), incorporated herein by reference. Another group of useful polyolefins is those that have pendent groups susceptible to crosslinking and have been obtained either through copolymerization, as described in U.S. Pat. No. 5,112,882 (Babu, et al), incorporated herein by reference, or through chemical modification, as described in U.S. Pat. No. 5,407,970 (Babu, et al), incorporated herein by reference.

Useful polyolefins are generally self-tacky or made tacky by adding a tackifier miscible in the polyolefin. Tackifier may also be added to a self-tacky polymer to augment pressure-sensitive adhesive properties such as peel adhesion and tack. Tackifiers often lower the viscosity of a polymer and thus may be used to make the polymer more suitable for hot melt processing.

Hydrocarbon tackifiers are preferred for use in the pressure-sensitive adhesive compositions of the present invention. Useful tackifying resins include resins derived by polymerization of the following: $C_5$ to $C_9$ unsaturated hydrocarbon monomers, polyterpenes, synthetic polyterpenes, and the like. Examples of useful commercially available tackifying resins are those available under the trade names WINGTACK 95 and WINGTACK 115 from Goodyear Tire and Rubber Co., Akron, Ohio. Other useful hydrocarbon tackifier resins are available under the trade names REGALREZ 1078 and REGALREZ 1126 from Hercules Chemical Co., Wilmington, Del., and under the trade names ARKON P90 and ARKON P115 from Arakawa Chemical Co. (USA), Chicago, Ill.

The tackifier may be ethylenically unsaturated; however, saturated tackifiers are preferred for those applications where oxidation resistance is important. The total amount of tackifying resin in the poly(1-alkene) component preferably is from 0 to 150 parts by weight, more preferably 5 to 50 parts by weight, and most preferably 10 to 35 parts by weight, per 100 parts of the poly(1-alkene) component. In one embodiment, the adhesive is polyhexene with an inherent viscosity of about 3.5.

The micro-channeled protective film of the present invention may be used to protect the surface of a body or parts of automobiles coated with a paint system. In particular, the sheet for protecting a paint system of the present invention is advantageously used to facilitate the transfer of trapped water or water vapor away from the painted surface.

The sheet of the present invention may be applied to the surface of an automobile. The rails and the channels facilitate wrinkle-free application of the present invention by providing some amount of stiffness in the sheet and providing a means for the air to escape. The protective film may then be smoothed over the automobile, by hand or using a mechanical device such as a squeegee. This action removes excess air from under the protective film, as well as any water or water vapor. Additionally, the channels formed in the protective film of the present invention allow for water removal after application. Therefore, the water and water vapor do not become trapped, eliminating or reducing the defects caused by water on the paint system.

In some embodiments of the present invention, the rails 14 are formed from a material that softens at a temperature less than the temperature to which the sheet 6 will be exposed to during use. In such embodiments, the rails 14 may soften and partially or completely collapse after application of the film to the surface if exposed to such higher temperatures. The collapse of the rails will partially or completely eliminate the micro-channels on the micro-channeled surface 8, essentially forming a flat, wrinkle-free film in continuous contact with the surface.

The present invention will be described in more detail by reference to the following examples, but it should be understood that the present invention is not construed as being limited thereto.

EXAMPLES

These examples are merely for illustrative purposes only and are not meant to be limiting on the scope of the appended claims. All parts, percentages, ratios, etc. in the examples and the rest of the specification are by weight of the total composition unless indicated otherwise.

Several micro-channeled protective films were prepared by profile co-extrusion. These examples include different rail geometry films having a thin polyolefin base sheet with adhesive-tipped rails. The following examples serve to illustrate this concept and to provide evidence that micro-channeled protective film has superior properties for the protection of a painted system. Several protective film constructions employing different rail geometries (see below), different polyolefin copolymer base films, different rail elastomers of thermoplastic polyolefins; and different polyolefin adhesives are provided below.

Example 1

A micro-channeled protective film was prepared by profile co-extrusion of a rail film having a thin polypropylene base sheet with adhesive-tipped elastomer rails. Specifically, Base Film 1 was fed into a single screw extruder (supplied by Davis Standard Corporation, Pawcatuck, Conn.) having a diameter of 2.5 inches (6.3 cm), a length/diameter (L/D) ratio of 24/1, and a temperature profile that steadily increased from approximately 350–475° F. (177–246° C.). Similarly, Rail Elastomer 1 was fed into a separate single screw extruder (supplied by Brabender OHG, Duisburg, Germany) having a diameter of 1.25 inches (3.2 cm), a length/diameter ratio of 24/1, and an identical temperature profile. Adhesive 1, used specifically to provide adhesion to the olefin-based rails and holding power for the tape, was fed into a 2.0 inch (5.1 cm) diameter Bonnot adhesive feeder (supplied by The Bonnot Company, Uniontown, Ohio), maintained at 450° F. (232° C.). The polypropylene and elastomer resins were each continuously discharged at pressures of at least 100 psi (689 kPa) through necktubes heated to 475° F. (246° C.) and into one port of a 3-layer adjustable vane feedblock (supplied by Cloeren Company, Orange, Tex.) configured to form a layered film construction having uniform layer thickness. The adhesive was metered via a melt pump through a necktube, both maintained at 475° F. (246° C.), and into a third port of the 3-layer feedblock. The feedblock was mounted atop an 8-inch (20.3 cm) wide MasterFlex™ LD-40 film die (supplied by Production Components, Eau Claire, Wis.), both of which were maintained at a temperature of 475° F. (246° C.). The resin stack created in the feedblock was fed into the die, which had a die lip configured to form a micro-channeled rail film profile. The feed was 84% Base Film 1, 7% Rail Elastomer 1 and 9% Adhesive 1.

MATERIALS

| Material | Trade Name | Description & Supplier |
|---|---|---|
| Base Film 1 | 7C06 | Melt processable ethylene-polypropylene copolymers, commercially available from Dow Plastics of Midland, Michigan (Formerly supplied by Union Carbide Corp., Danbury, CT). |
| Base Film 2 | 7C55H | |
| Rail Elastomer 1 | ENGAGE 8100 | Thermoplastic polyolefins, commercially available from Dupont-Dow Elastomers L.L.C. of Wilmington, DE. |
| Rail Elastomer 2 | ENGAGE 8540 | |
| Rail Elastomer 3 | Lotryl 28MA07 | Thermoplastic polyolefin, commercially available from Atofina Chemicals, Inc. of Philadelphia, PA |
| Resin 1 | REGALREZ 1139 | Hydrogenated hydrocarbon tackifier resins, commercially available from Hercules Inc., Wilmington, DE. |
| Resin 2 | REGALREZ 1126 | |
| Polypropylene 1 | ExxonMobil PP3505 | A polypropylene resin, commercially available from Exxon Mobil Corporation, Irving, TX. |
| Adhesive 1 | Polyhexene-based adhesive | Made with an inherent viscosity of 3.5 dL/g, as described in Example 4 of U.S. Pat. No. 5,644,007 to Davidson, et al. |
| Adhesive 2 | Polyhexene-based adhesive blended with REGALREZ 1139 resin and ExxonMobil PP3505 | Polyhexene-based adhesive made with an inherent viscosity of 3.4 dL/g, as described in Example 4 of U.S. Pat. No. 5,644,007, further blended with 18% w/w Resin 1 and 5% w/w Polypropylene 1 |
| Adhesive 3 | Polyhexene-based adhesive, blended with REGLREZ 1126 resin | Polyhexene-based adhesive made with an inherent viscosity of 2.8 dL/g, as described in Example 4 of U.S. Pat. No. 5,644,007, further blended with 12% w/w Resin 2 |
| Adhesive 4 | Poly-1-octene-based adhesive | Made with an inherent viscosity of 3.6 dL/g, as described Example 3 of U.S. Pat. No. 5,644,007 |

The adhesive-tipped rail film extruded from the die was drop-cast at 10 feet/minute (3 meters/minute) into a quench tank maintained at 50–60° F. (10–16° C.) for a residence time of at least 10 seconds. The quench medium was water with <0.01% by weight of a surfactant, Ethoxy CO-40 (a polyoxyethylene castor oil available from Ethox Chemicals, LLC, Greenville, S.C.) used to facilitate wet-out of the hydrophobic polyolefin materials. The quenched rail films were then air-dried and collected in 20-yard (18 m) rolls. Example 1 had a base film thickness of 0.009±0.001 inches (0.23±0.03 mm), a rail width of 0.007±0.001 inches (0.18±0.03 mm), a rail height including the adhesive tip of 0.017±0.002 inches (0.43±0.05 mm), a side surface separation between adjacent rails of 0.013±0.002 inches (0.33±0.05 mm), and a channel cross-sectional area (defined as the cross-sectional area between adjacent rails; calculated by multiplying the distance between the adhesive tip 26 and the second major surface 13*b* by the distance separating adjacent rails) of around $2.2 \times 10^{-4}$ square inches (0.14 square mm). Screen packs were used at all feedblock entrances and at the Bonnot screen changer to minimize contaminants in the polymer extrudate. All rollers exposed to adhesive were wrapped with silicone-coated paper release liner to prevent the tape from sticking to the rollers. A roughness value (Ra) was calculated according to Surface Roughness, Definitions and Designations, Japanese Industrial Standard JIS B 0601. The rectangular cross sectional shape of the micro-channeled protective tape of the present invention is a regular array. In the case of a regular array, the roughness (Ra) is calculated by multiplying the rail width by the rail height and dividing that product by the sum of the rail width and the distance between side surfaces of adjacent rails. Example 1 has a Ra value of 140 microns.

Example 2

A micro-channeled protective film was prepared using the same method described in Example 1, except using Base Film 2, Adhesive 2, and a different die configured to form a larger micro-channeled rail film profile. The feed was 48.5% Base Film 2, 24.5% Rail Elastomer 1 and 27% Adhesive 2. Example 2 was constructed with larger channels for improved moisture transfer. Example 2, produced at 10 feet/minute (3 meters/minute), has a base film thickness of 0.004±0.001 inches (0.10±0.03 mm), a rail width of 0.012±0.002 inches (0.30±0.05 mm), a rail height, including the adhesive tip, of 0.059±0.002 inches (1.50±0.05 mm), a side surface separation between adjacent rails of 0.028±0.002 inches (0.71±0.05 mm), a channel cross sectional area of around $16.5 \times 10^{-4}$ square inches (1.06 square mm), and an overall basis weight of approximately 452 g/m$^2$. Example 2 has a Ra value of 334 microns.

Example 3

A micro-channeled protective film was prepared using the same method described in Example 1, except using Base Film 2, Rail Elastomer 3, Adhesive 3, and a different die configured to form smaller channels but with a larger number of rails to provide more surface area for adhesion. The feed was 60% Base Film 2, 11% Rail Elastomer 3 and 29% Adhesive 3. Example 3, produced at 30 feet/minute (9 meters/minute), has a base film thickness of 0.001±0.001 inches (0.03±0.03 mm), a rail width of 0.006±0.001 inches (0.15±0.03 mm), a rail height of 0.020±0.002 inches (0.51±0.05 mm), a side surface separation between adjacent rails of 0.020±0.002 inches (0.51±0.05 mm), a channel cross sectional area of around $4.0 \times 10^{-4}$ square inches (0.26 square mm), and an overall basis weight of approximately 162 g/m$^2$. Example 3 has a Ra value of 112 microns.

Example 4

A micro-channeled protective film was prepared using the same method described in Example 3, except Base Film 2 was used as both the base film and the rail elastomer. The feed was 83.5% Base Film 2 and 16.5% Adhesive 3. Example 4, produced at 30 feet/minute, (9 meters/minute) has a base film thickness of 0.002±0.001 inches (0.05±0.03 mm), a rail width of 0.006±0.001 inches (0.15±0.03 mm), a rail height of 0.024±0.002 inches (0.61±0.05 mm), a side surface separation between adjacent rails of 0.018±0.002 inches (0.46±0.05 mm), a channel cross sectional area of around $4.3 \times 10^{-4}$ square inches (0.28 square mm), and an overall basis weight of approximately 164 g/m$^2$. Example 4 has a Ra value of 157 microns.

Example 5

A micro-channeled protective film was prepared using the same method described in Example 4, except using Adhesive 4 and a different die. The feed was 87.5% Base Film 2 and 12.5% Adhesive 4. Example 5, produced at 30 feet/minute (9 meters/minute), has a base film thickness of 0.002±0.001 inches (0.05±0.03 mm), a rail width of 0.024±0.002 inches (0.61±0.05 mm), a rail height of 0.003±0.001 inches (0.08±0.03 mm), a side surface separation between adjacent rails between adjacent rails of 0.028±0.002 inches (0.71±0.05 mm), and a channel cross sectional area of around $0.94 \times 10^{-4}$ square inches (0.06 square mm). Example 5 has a Ra value of 40 microns.

Example 6

A micro-channeled protective film was prepared using the same method described in Example 2, except the feed was 62% Base Film 2, 17% Rail Elastomer 1 and 21% Adhesive 2. Example 6, produced at 30 feet/minute (9 meters/minute), has a base film thickness of 0.003±0.001 inches (0.08±0.03 mm), a rail width of 0.006±0.002 inches (0.15±0.05 mm), a rail height of 0.032±0.001 inches (0.81±0.03 mm), a side surface separation between adjacent rails of 0.033±0.002 inches (0.30±0.05 mm), and a channel cross sectional area of around $10.6 \times 10^{-4}$ square inches (0.68 square mm). Example 6 has a Ra value of 125 microns.

Example 7

A micro-channeled protective film was prepared using the same method described in Example 1, except using Rail Elastomer 2. The feed was 87% Base Film 1, 7% Rail Elastomer 2 and 6% Adhesive 1. Example 7, produced at 30 feet/minute (9 meters/minute), has a base film thickness of 0.008±0.001 inches (0.20±0.03 mm), a rail width of 0.005±0.002 inches (0.13±0.05 mm), a rail height of 0.016±0.001 inches (0.41±0.03 mm), a side surface separation between adjacent rails of 0.015±0.002 inches (0.38±0.05 mm), and a void cross sectional area of around $2.3 \times 10^{-4}$ square inches (0.15 square mm). Example 7 has a Ra value of 100 microns.

Comparative Example 1

A commercially available flat film transit tape, sold under the tradename RAPGARD F3E is available from Kansai Paint (America) Inc., Fort Lee, N.J.

Testing & Evaluation

The performance of the examples was evaluated by placing these films onto paint panels, conditioning the samples as described below, measuring the 180-degree peel adhesion required to remove the film, and then visually inspecting the paint panels for defects (e.g., discolorations and adhesive residue). The paint panels used for the tests were steel panels coated by ACT Laboratories, Inc. of Hillsdale, Mich., one of which comprised a HWB 7517 Black basecoat formulation and a CNCT7PS clearcoat formulation provided by PPG Industries of Pittsburgh, Pa., and another which comprised an ODCT6373 Black basecoat formulation and an ODCT1002B clearcoat formulation also provided by PPG Industies.

Measurements of discoloration defects and adhesive transfer were performed with each of the examples as follows. Using an eyedropper, a 0.5-gram droplet of de-ionized water was placed onto the center of one of aforementioned paint panels. A 50 mm wide strip of protective tape sample was placed over the droplet and applied with finger pressure (as is commonly performed in the commercial application of protective tapes to vehicles) such that the water droplet was isolated (entrapped) under the center section of the test strip. The prepared panel was then placed horizontally into a convection oven maintained at 80° C. for six days. At the end of this period, the tape was removed and the paint panel surface was examined for visual defects (discolorations, adhesive residue, etc.). The results of the discoloration and adhesive transfer tests are shown in Table 1.

Measurements of 180-degree peel adhesion were performed with these same samples using an Instrumentors, Inc. model 3M90 slip/peel tester, supplied by Instrumentors, Inc., Cleveland, Ohio. One-inch (2.54 cm) wide samples of Examples 1–7 and the Comparative Example 1 were applied with a 1-lb (0.45 kg) roller to clean (cleaned with isopropanol) paint panels comprising the HWB 7517 Black basecoat and CT7PS clearcoat formulations. The samples were aged in place on the panels at standard temperature and pressure for 24 hours, and then peeled from the panel at a rate of 12 inches/minute (30.5 cm/minute). The peel adhesions measured in ounces/inch for these samples are shown in Table 1, and indicate that the micro-channel protective film samples have good holding power to painted automotive surfaces.

TABLE 1

| Example | Adhesive Residue | Discoloration Defects* | Peel Adhesion oz/inch (gram/cm) |
|---|---|---|---|
| 1 | None | None | 5.5 (61) |
| 2 | None | Few | 25.6 (286) |
| 3 | None | None | 16.9 (189) |
| 4 | None | None | 10.6 (118) |
| 5 | None | Numerous | 9.2 (103) |
| 6 | None | Some | 2.7 (30) |
| 7 | None | None | 2.9 (32) |
| Comparative Example 1 | None | Numerous | 20.3 (227) |

*None < Few < Some < Numerous

Table 1 indicates that examples of the invention have fewer discoloration defects typically cause by flat film transit tapes, and have the necessary peel adhesion (i.e., peel performance comparable to the commercial Rapgard product) such that the tapes remain adhered to the vehicle and remove cleanly without leaving behind adhesive residue.

Various modifications and alterations of the present invention will become apparent to those skilled in the art without departing from the spirit and scope of the invention.

What is claimed is:

1. A film comprising
   a backing comprising
      a base layer comprising a first major surface and a second major surface; and
      at least two rails, each rail comprising a tip surface, the rails extending from the second major surface of the base layer and defining micro-channels therebetween, the micro-channels comprising a channel surface; and
   an adhesive on the tip surface of the rails,
   at least a portion of the channel surface being substantially free of adhesive.

2. The film of claim 1 wherein the width of the rails is between about 0.03 to about 5.0 millimeter.

3. The film of claim 1 wherein the width of the rails is between about 0.05 and about 0.5 millimeter.

4. The film of claim 1 wherein the distance between the rail tip surface and the second major surface of the backing is between about 0.03 to about 2.5 millimeter.

5. The film of claim 1 wherein the distance between the rail tip surface and the second major surface of the backing is between about 0.1 to about 1.3 millimeter.

6. The film of claim 1 wherein the rails have side surfaces and the distance between adjacent rail side surfaces is between about 0.05 to about 5.0 millimeter.

7. The film of claim 6 wherein the distance between adjacent rail side surfaces is between about 0.3 to about 1 millimeter.

8. The film of claim 1 wherein the base layer is between about 0.003 and about 12.7 millimeters thick.

9. The film of claim 1 wherein the base layer is between about 0.03 and about 0.13 millimeters thick.

10. The film of claim 1 wherein the backing is multilayer.

11. The film of claim 1 wherein the base layer is multilayer.

12. The film of claim 1 wherein the rails are multilayer.

13. The film of claim 1 wherein the base layer comprises a first material and the rails comprise a second material, the first material being different from the second material.

14. The film of claim 13 wherein the base layer comprises a polypropylene or copolymer thereof and the rails comprise a thermoplastic elastomer or a thermoplastic polyolefin.

15. The film of claim 1 wherein the rails comprise a polymeric material that softens below 80° C.

16. The film of claim 1 wherein the rails extend in a substantially parallel relationship with respect to one another in a single direction along the base layer, each rail being substantially continuous along the entire length of the base layer.

17. The film of claim 1 wherein the rails extend in a substantially parallel relationship with respect to one another in a single direction along the base layer, each rail being substantially discontinuous along the entire length of the base layer.

18. The film of claim 1 wherein the second major surface of the base layer is substantially free of adhesive.

19. The film of claim 1 wherein the rails have a side surface, and the side surface is substantially free of adhesive.

20. A method of protecting an automobile comprising
   preparing an automobile surface for application of a protective tape;
   applying a protective tape to the automobile surface, the protective tape comprising a backing comprising
a base layer comprising a first major surface and a second major surface; and
at least two rails comprising a tip surface, the rails extending from the second major surface of the base layer, the rails defining micro-channels therebetween, the micro-channels comprising a channel surface; and
an adhesive on the tip surface of the rails.

21. The method of claim 20 further comprising exposing the protective tape to an elevated temperature after applying the protective tape to the automobile surface to soften the rails and cause them to flow together to thereby partially or completely eliminate the micro-channels.

22. A method of manufacturing a protective film comprising
providing at least one film forming material;
providing an adhesive material;
feeding the film forming material and the adhesive material into an extrusion process having a die, wherein the die has a profile; and
simultaneously extruding the adhesive material and the film forming material through the die to create micro-channels in the film forming material.

* * * * *